United States Patent [19]

Brown

[11] 4,387,689
[45] Jun. 14, 1983

[54] APPARATUS FOR CONVERTING A CARBURETOR FOR GASEOUS FUEL

[75] Inventor: William J. Brown, Whatcom County, Wash.

[73] Assignee: Bureau of Faculty Research of Western Washington University, Bellingham, Wash.

[21] Appl. No.: 263,922

[22] Filed: May 15, 1981

[51] Int. Cl.³ ............................................ F02M 21/04
[52] U.S. Cl. ................................... 123/525; 123/527; 48/180 C; 261/16
[58] Field of Search ............. 123/525, 527; 48/180 C, 48/184; 261/DIG. 56, 16, DIG. 67, 44 A, 44 R

[56] References Cited

U.S. PATENT DOCUMENTS

| | | | |
|---|---|---|---|
| 2,939,775 | 6/1960 | Middleton et al. | 123/527 |
| 3,081,160 | 3/1963 | Ensign | 123/527 |
| 3,545,948 | 12/1970 | Baverstock | 48/184 |
| 4,063,905 | 12/1977 | Johnson et al. | 48/180 C |
| 4,119,068 | 10/1978 | Csonka et al. | 261/DIG. 56 |
| 4,308,843 | 1/1982 | Garretson | 123/525 |

Primary Examiner—Charles J. Myhre
Assistant Examiner—E. Rollins Cross
Attorney, Agent, or Firm—Seed, Berry, Vernon & Baynham

[57] ABSTRACT

An attachment within the air cleaner housing of a liquid-fuel internal-combustion engine, the attachment having a circumferential venturi air passage and a gaseous fuel inlet slot inboard of the narrowest portion of the venturi air passage.

11 Claims, 2 Drawing Figures

APPARATUS FOR CONVERTING A CARBURETOR FOR GASEOUS FUEL

DESCRIPTION

TECHNICAL FIELD

This invention pertains to internal-combustion engines and particularly to providing a carburetor for an internal-combustion engine which will run selectively on liquid or gaseous fuel.

BACKGROUND ART

Internal-combustion engines have heretofore been convertible to burning gaseous fuel in addition to liquid fuel, generally by the replacement of the carburetor of the engine. That is, in addition to the normal addition of gaseous fuel tanks, selector valves, etc., most carburetors have been converted by adding a large and complicated auxiliary carburetor to the liquid fuel carburetor on the engine. In general, these auxiliary carburetors or conversion carburetors have occupied excessive space in the crowded engine compartment of the modern automobile and have been difficult to maintain. In some instances, the hood over the engine compartment had to be replaced or modified to accommodate the additional carburetion equipment. As a result, the full implementation of lower priced, pollution-reducing gaseous fuel has not been successful.

DISCLOSURE OF THE INVENTION

It is an object of this invention to provide an inexpensive carburetor conversion to allow the internal-combustion engine to run on either gaseous or liquid fuel.

It is another object of this invention to provide a liquid and gaseous fuel carburetor that is confined within the existing standard liquid-fuel carburetor air cleaner housing so that no modifications need be made to the engine compartment or hood over the engine compartment.

Basically, these objects are obtained by providing a venturi-shaped air passage in a gaseous fuel carburetor attachment which fits totally within the confines of the liquid-fuel air cleaner housing. This attachment, with its venturi air passage, is then fitted to the liquid-fuel carburetor inlet flange by one of several types of adapters which can conform to the various shapes of carburetor inlet flanges of modern internal-combustion engines. The venturi air passage is precisely joined to the gaseous fuel supply to obtain proper mixing of the gaseous fuel and air as it passes into the carburetor inlet flange. Advantageously, the air cleaner and air cleaner housing need not be modified when adding this attachment. Secondly, the parts can be inexpensively mass produced for all internal combustion engines with only the adapter needing to be of a variable shape necessary as a transition piece between the standardized parts of the carburetor attachment and the various shapes of carburetor inlet flanges.

Preferably, the gaseous fuel inlet into the venturi air passage is precisely located along a circumferential slot or plurality of circumferentially spaced holes just inward of the narrowest portion of the neck of the venturi. Also in the preferred embodiment, the venturi air passage is formed of a set of spaced plates which can be adjusted relative to one another to that the size of the venturi air passage can be varied, depending on the make and model of the internal-combustion engine being converted.

BEST MODE FOR CARRYING OUT THE INVENTION

Figure 1:
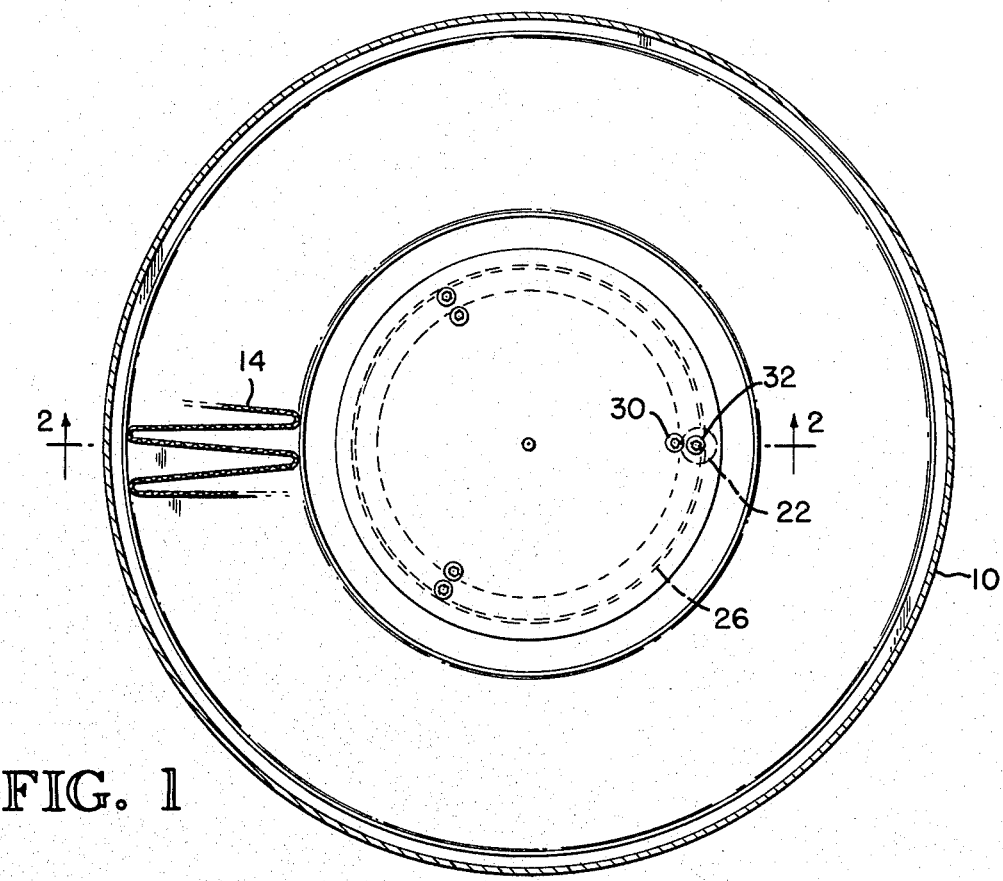
FIG. 1 is a section of a carburetor embodying the principles of the invention taken along the line 1—1 of FIG. 2.
Figure 2:
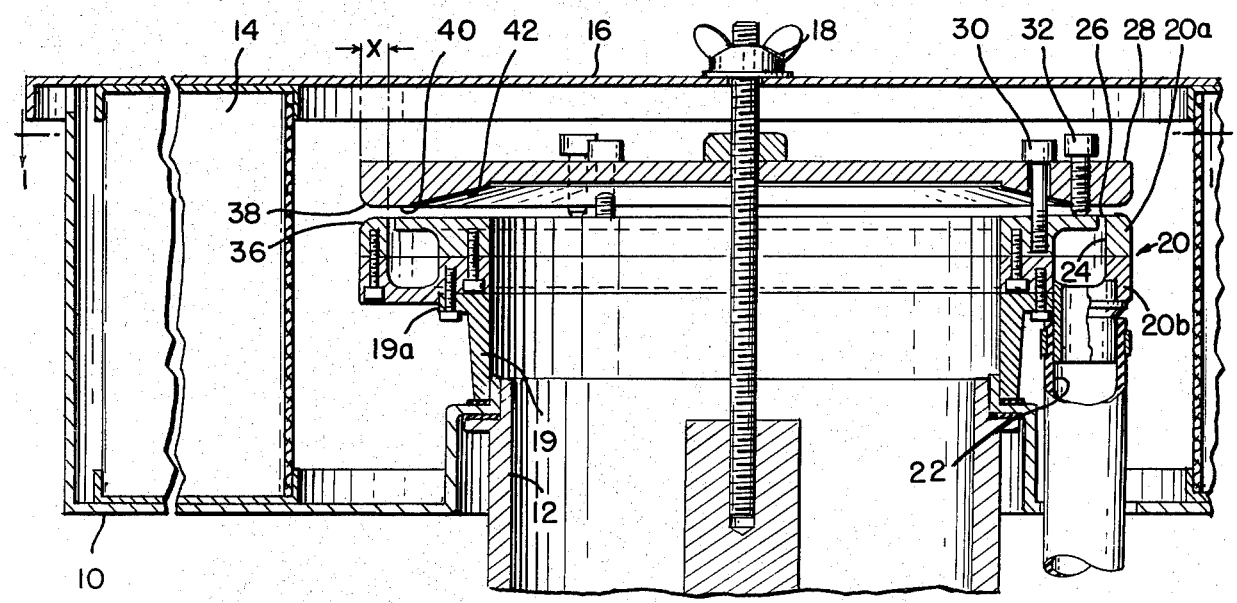
FIG. 2 is a section taken along the line 2—2 of FIG. 1.

As best shown in FIG. 2, a conventional carburetor for an internal-combustion engine includes a carburetor air cleaner housing 10 joined in a conventional manner to a carburetor inlet flange 12. A standard air cleaner 14 is fitted within the air cleaner housing and a cover 16 is bolted to hold the air cleaner cover 16 in place by bolt 18.

Fitted within the air cleaner inlet flange is an adapter ring 19. This ring will be one of various shapes, depending upon the shape and size of the carburetor inlet flange, which varies between different engine sizes and models. The upper end 19a of the ring, however, will be a standard shape, regardless of the shape of the bottom of the adapter ring and will thus allow the remainder of the parts of the attachment to be standardized for most models and makes of engines.

Bolted to the upper end 19a of the carburetor adapter ring 19 is a lower venturi plate 20 formed of an upper half 20a and a lower half 20b. The lower half 20b connects to a gaseous fuel intake pipe 22 which communicates with a plenum chamber 24. The plenum chamber terminates in a circumferential slot or plurality of circumferentially spaced openings 26. Spaced over the lower venturi plate 20 is an upper venturi plate 28. The upper plate is attached to the lower plate by cap screws 30 and is spaced in accurately adjustable position relative to the lower plate 20 by cap screws 32. The lower plate 20 is preferably provided with a smooth horizontal wall, beginning at an outer circumferential edge that is curved inwardly, as at 36, to form one-half of the venturi inlet passage. The upper plate 28 is also provided with a smoothly converging outer edge 38 forming the upper half of the venturi air passage. The venturi air passage also has a narrow neck portion 40 and a diverging section 42 inward of the narrow neck portion 40. Preferably, the gaseous fuel inlet opening 26 is located slightly inboard (approximately 0.125–0.196 inch) from the outside edge. This placement of the gaseous fuel inlet openings provides the optimum mixing of gaseous fuel with air.

This carburetor is ideally used with natural gas as the gaseous fuel and, as well understood, can be used with conventional liquid fuel, as desired. Also, as well understood, the normal operating sequence is to stop the flow of liquid fuel, then to start the flow of gaseous fuel while allowing the liquid fuel to run completely out of the carburetor before starting onto the gaseous fuel. Timing of the valve sequence is provided in the conventional manner, with the additional use of sensors, relays, etc., to make any distributor adjustments and to start and stop the flows of the respective fuels, as is well known.

While the preferred embodiment of the invention has been illustrated and described, it should be understood that variations will be apparent to one skilled in the art without departing from the principles herein. Accordingly, the invention is not to be limited to the specific embodiment shown in the drawings.

I claim:

1. A gaseous and liquid-fuel carburetor for an internal-combustion engine having a liquid-fuel carburetor with an inlet flange, an air cleaner housing, and an air cleaner, comprising:

an adapter member for coupling to said carburetor inlet flange, and mixing means within said air cleaner housing coupled to said adapter member, said mixing means including an air inlet venturi nozzle for guiding air into said inlet flange, and means within said venturi nozzle for introducing gaseous fuel into the venturi for mixing with air, said air inlet venturi including a pair of upper and lower spaced plates defining a substantially continuous, circumferential venturi passage, said passage converging from an outer large entrance opening defined by smooth curved opposed corners on said plates to an intermediate narrow neck portion defined by elongated substantially parallel opposed surfaces on said plates, said surfaces downstream of said narrow neck portion smoothly diverging for a substantial length to an inner larger discharge opening, said means for introducing gaseous fuel being located at the closest spacing between said substantially parallel surfaces in said intermediate narrow neck opening, and downstream of said corners sufficient to be in substantially laminar flow, and wherein said smoothly curved corners, said substantially parallel surfaces of said narrow neck portion with the means for introducing the gaseous fuel located therein, and said smooth divergence to the discharge opening being capable of providing a low air pressure at the gaseous fuel introduction location but only a small total pressure drop across the entire venturi thereby maximizing fuel input and air input to the carburetor.

2. The carburetor of claim 1, said adapter member and mixing means all fitting without modification into said air cleaner housing and air cleaner, whereby no modification of the air cleaner housing is necessary.

3. The carburetor of claim 1, said gaseous fuel opening being a continuous circumferential slot.

4. The carburetor of claim 1, said gaseous fuel opening being a plurality of circumferentially spaced holes.

5. The carburetor of claim 1, including means for adjusting the spacing between said two plates for varying the size of the venturi nozzle opening.

6. The carburetor of claim 1, said means for introducing gaseous fuel including a circumferential plenum chamber within said lower plate.

7. The carburetor of claim 1, said adapter flange having a variable lower end for matching to various shaped inlet flanges and a standard size upper end for joining to the mixing means, whereby only the adapter flange need be of different configuration for different shaped carburetor inlet flanges.

8. The carburetor of claim 1, said smoothly diverging surfaces extending a distance greater than the length of said substantially parallel surfaces.

9. The carburetor of claim 1, wherein the means for introducing the gaseous fuel is located about 0.125–0.196 inch inboard of the outer edges of the spaced plates.

10. A gaseous fuel attachment for a liquid-fuel internal-combustion engine, comprising:

an adapter member for joining to the inlet flange of of carburetor, a pair of spaced plates forming a generally continuous circumferential venturi air passage, said passage converging from an outer large entrance opening defined by smooth curved opposed corners on said plates, to an intermediate narrow neck portion defined by elongated substantially parallel opposed surfaces on said plates, and a discharge portion defined by surfaces smoothly diverging to an inner large discharge opening, and a gaseous fuel inlet opening located between said plates and downstream of said corners to be in substantially laminar flow, and wherein said smoothly curved corners, said substantially parallel narrow neck portion with the gaseous fuel inlet located therein, and said smooth divergence to the discharge opening being capable of providing a low air pressure at the fuel inlet location but a small total pressure drop across the entire venturi thereby maximizing fuel input and air input to the carburetor.

11. The attachment of claim 10, said venturi air passage having a narrow neck portion, the fuel inlet opening being located at the narrow neck portion about 0.125–0.196 inch inboard of the outer edge of the spaced plates.

* * * * *